United States Patent Office 3,442,960
Patented May 6, 1969

3,442,960
HIGH SELECTIVITY PROCESS FOR THE CHLORINATION OF METHYLBENZENES
Charles H. De Puy, Boulder, and Harold D. Rider, Denver, Colo., assignors to Marathon Oil Company, Findlay, Ohio, a corporation of Ohio
No Drawing. Filed Jan. 23, 1967, Ser. No. 610,785
Int. Cl. C07c 25/04, 17/02
U.S. Cl. 260—651  5 Claims

ABSTRACT OF THE DISCLOSURE

The present invention comprises a process for the preparation of chloromethylbenzenes from methylbenzenes with minimun production of dichloromethylbenzenes by contacting said methylbenzenes with elemental chlorine in the liquid phase in a solvent comprising a major portion of a solvent selected from the group consisting of benzene and mono-, di-, and tri-chlorobenzenes, and benzene-acetonitrile mixture, and mixtures of the foregoing, at a temperature of from about 0 to about 200° C., and thereafter recovering the chloromethylbenzene thus formed.

---

The present invention relates to the chlorination of methylbenzenes and in particular relates to new processes for producing mono-(chloromethyl) and poly-(chloromethyl) benzenes with minimal attendant production of dichloromethyl benzenes.

Heretofore there have been a number of attempts to produce various mono- and poly-chloromethylbenzenes (benzenes which contain one or more monochloromethyl groups) without the concurrent production of the less desirable mono- and poly-dichloromethylbenzenes (benzenes which contain dichloromethyl groups). For example, U.S. 2,446,430 teaches methods of attaching one chlorine atom to each methyl group without forming the monochloromethyl, dichloromethyl benzene counterpart by chlorination in a carbon tetrachloride liquid solvent. However, attempts to reproduce the results of U.S. 2,446,430 and of a somewhat related paper by Harvey, Smith, Stacey and Tatlow in 4 J. Appl. Chem., 319 (June 1954), have proven unsuccessful. Further, theoretical studies by Beltrame et al., 70 J. Physical Chem., 1150 (No. 4, 1966), and 44, Tetrahedron Letters, 3909 (1965), indicate that the highest yield theoretically possible is about 75% of the desired bis (chloromethyl) benzene using the carbon tetrachloride liquid solvent technique.

The present invention embodies the discovery that certain selected solvents permit the attainment of yields of up to 85% or even greater of the desired products based on the total amount of chlorinated methyl benzenes produced. Further, the present invention avoids undesirable nuclearly chlorinated by-products.

The present invention comprises producing monochloromethylbenzenes with minimum production of dichloromethylbenzenes by contacting said methylbenzenes with elemental chlorine in the liquid phase in a solvent selected from the group consisting of benzene and mono-, di-, and tri-chlorobenzenes at a temperature of from about 0 to about 200 degrees C., and thereafter recovering the chloromethyl benzene thus formed.

Preferred starting materials for the practice of the present invention are methylbenzenes, particularly those having from one to four methyl groups per molecule. Still more preferred are di- and trimethylbenzenes with xylenes being most preferred as starting materials.

The specially selected solvents of the present invention consist of benzene and its nuclearly substituted mono-, di- and trichloro derivatives. Of these are benzene, monochlorobenzene, and ortho-dichlorobenzene are most preferred as solvents. Especially desirable is a mixture of preferably from 5 to about 30, and more preferably, from 8 to about 20 mole percent acetonitrile in benzene. This latter preferred solvent is especially unexpected because acetonitrile alone is not a desirable solvent for the process of the present reaction. Mixtures of the foregoing may be employed.

From about 0.5 to about 100, more preferably from 1 to about 20, and most preferably, from 2 to about 10 moles of solvent should be present for each mole of methylbenzene starting material.

The temperature for the processes of the present reaction should be sufficiently high to maintain the mixture of methylbenzenes and solvent in the liquid state and sufficiently low to prevent substantial vaporization of the reactants under the reaction conditions. Temperatures of from 0 to 200, more preferably from 15 to about 150, and most preferably, from 60 to about 100 degrees C. will be preferred, with the temperatures within these ranges being chosen to prevent either solidification or excessive vaporization of the reactants.

Pressure is not narrowly critical and may be from about 0.1 to over 10,000 p.s.i.g. However, in general, the reaction will be run at from about 0.8 to about 2 atmospheres pressure since the pressure will in general serve only to maintain the reactants in the liquid state.

The desired products of the present reaction are probably best described as alpha, alpha prime chloromethylbenzenes. However, it should be understood that this term, as used herein, is not restricted to benzenes containing only two chloromethyl groups, but merely serves to indicate that the methyl groups each contain only one chlorine atom. The undesirable products, which are minimized by the processes of the present invention, may be described as alpha, alpha chlorinated products, it being again understood that this refers to any methyl benzene which contains more than one chlorine on any of its methyl groups.

Use of various free radical initiating catalysts will be greatly preferred to enhance the reactions, e.g. actinic light, e.g. ultraviolet, sunlight, incandescent light; organic peroxides and hydroperoxides, e.g. those listed at 58 Industrial and Engineering Chemistry 25–32 (March 1966) and in the references thereto, and in the Lucidol Monograph published by Wallace & Tiernan Inc. Buffalo, N.Y.; nitriles, e.g. azodisisobutyronitrile, azo bis (alpha, gamma-dimethylvaleronitrile, etc. and other compounds known to enhance free radical reactions.

It is preferable to add the chlorine relatively slowly through a sparger or inlet tube with mechanical agitation of the reaction mixture. Chlorine flow rates of from about 0.1 to 10, more preferably from 1 to about 5, most preferably approximately 2 moles of chlorine per hour should be added for each mole of the methylbenzenes present in the reaction mixture.

The addition of chlorine to the reaction mixture will generally be continued until a conversion of from about 20 to about 100, and more preferably from 30 to about 90, and most preferably from 50 to about 80% of the methylbenzene starting material has been converted to compounds containing at least one chlorine atom per molecule. This conversion is most conveniently measured by conventional techniques of gas-liquid chromatography.

The process of the present invention is preferably run in a suitable reactor equipped with a condensing mechanism, e.g. a reflux condenser, mechanical stirrer, chlorine inlet sparger, and temperature controller. A conventional flow reactor can be used for continuous large scale production runs. Provision for recycling of partially chlorinated by-products is desirable.

The products of the present invention (the alpha, alpha prime-chloromethylbenzenes) can be recovered by conventional techniques, e.g. by distillation to remove solvent, or by selective crystallization. The preferred technique for the production of alpha, alpha prime dichloroxylenes and other products of the present invention is, for example, to first distill off and recover solvent, unreacted xylenes, and monochlorinated xylenes. The distillation may then be continued to recover the desired alpha, alpha prime dichloroxylenes by vacuum distillation or, alternatively, they may be recovered by crystallization from an aliphatic hydrocarbon solvent added to the distillation pot after removal of the monochlorinated xylenes, solvents and unreacted materials.

The uses of the chlorinated xylenes and other products of the invention are many and varied e.g. as chemical intermediates for the production of diamines, dinitriles, glycols, and many other organic compounds which in turn are useful as solvents, insecticides, and polymer intermediates.

It should be understood that the processes of the present invention are adaptable to a wide variety of modifications and variations which will be obvious to those skilled in the art upon a reading of the specification of the present application. All such obvious modifications and variations are to be taken as being included within the claims appended hereto. The invention will be better understood by reference to the following illustrative examples.

EXAMPLE I 13.6 g. p-xylene and 100 ml. benzene are charged to a 250 ml., 4-necked, flask equipped with a mechanical stirrer, immersible ultraviolet light source, chlorine inlet sparger, condenser and temperature controller. The mixture is brought to 60 degrees C., the ultraviolet light turned on and the chlorine is started flowing at a rate of 1.74 moles chlorine per mole of p-xylene per hour. One ml. samples are taken at 5 minute intervals and analyzed by gas chromatography. After 15 minutes 56.8% of the xylene had been converted to yield 1.3% alpha, alpha-dichloro-p-xylene, 6.2%, alpha, alpha prime-dichloro-p-xylene and 49.3%, alpha-chloro-p-xylene.

EXAMPLE II

When the process of Example I is repeated substituting an equal mole quantity of carbon tetrachloride for the benzene used in the preceding example, the results are as follow:

After 15 minutes reaction time, 49.0% of the xylene has been converted to yield 1.8% alpha, alpha-dichloro-p-xylene, 5.5% alpha, alpha prime-dichloro-p-xylene and 41.7%, alpha-chloro-p-xylene. This represents a 10% decrease in yield to alpha, alpha prime-dichloro-p-xylene from that described in Example I.

EXAMPLE III

Repeating the process of Examples I and II under identical conditions with other solvents gives the results listed in table.

| Example | Solvent | Conversion p-xylene | Ratio, alpha, alpha prime/ alpha, alpha |
|---|---|---|---|
| III | None | 23.2 | 3.46 |
|  |  | 51.9 | 3.33 |
| IV | Carbon tetrachloride | 32.7 | 3.10 |
|  |  | 68.9 | 3.32 |
| V | Carbon disulfide | 40.4 | 7.17 |
|  |  | 77.9 | 3.71 |
| VI | Benzene | 19.5 | 8.50 |
|  |  | 57.1 | 4.70 |
| VII | o-Dichlorobenzene | 30.3 | 9.83 |
|  |  | 75.9 | 6.23 |
| VIII | do | 49.7 | 6.92 |
|  |  | 80.1 | 5.04 |
| IX | Benzene, 10% acetonitrile | 33.5 | 11.04 |
|  |  | 67.9 | 5.94 |

It can readily be seen that greatly improved selectivities to the alpha, alpha prime-dichloro-p-xylene are realized by the process of this invention at low conversions. Selectivity to the desired material has been increased from 75% in carbon tetrachloride to greater than 90% in benzene-acetonitrile mixed solvent.

What is claimed is:
1. A process for the preparation of chloromethylbenzenes from methylbenzenes with minimum production of dichloromethylbenzenes by contacting methylbenzenes having from 1 to 4 methyl groups with elemental chlorine in the liquid phase in a solvent consisting essentially of a benzene-acetonitrile mixture containing from about 5 to about 30 mole percent acetonitrile and wherein from about 0.5 to about 100 moles of solvent are present for each mole of methylbenzene starting material, at a temperature of from about 0 to about 200° C., in the presence of a free-radical initiator, and thereafter recovering the chloromethylbenzene thus formed, wherein the chlorine is added at a flow rate of about 0.1 to 10 moles of chlorine per hour per mole of methyl benzenes present in the reaction mixture and chlorine is added until from about 20 to about 100% of the methyl benzene starting material has been converted to products containing at least one chlorine atom per molecule.

2. The process of claim 1 wherein the methylbenzene comprises xylenes.

3. The process of claim 1 wherein the methylbenzene consists essentially of para-xylene.

4. The process of claim 2 wherein the methylbenzene consists essentially of ortho-xylene.

5. The process of claim 2 wherein the methylbenzene consists essentially of meta-xylene.

References Cited

UNITED STATES PATENTS

| | | | |
|---|---|---|---|
| 2,412,389 | 12/1946 | Cass | 260—651 |
| 2,446,430 | 8/1948 | Norton | 260—651 XR |
| 2,814,649 | 11/1957 | Pritchard | 260—651 |
| 2,965,682 | 12/1960 | Horvath | 260—651 |
| 3,350,467 | 10/1967 | Lasco | 260—651 |

LEON ZITVER, *Primary Examiner.*

HOWARD T. MARS, *Assistant Examiner.*

U.S. Cl. X.R.

204—163

UNITED STATES PATENT OFFICE
CERTIFICATE OF CORRECTION

Patent No. 3,442,960 May 6, 1969

Charles H. DePuy et al.

It is certified that error appears in the above identified patent and that said Letters Patent are hereby corrected as shown below:

Column 2, line 7, "di- and trichloro derivatives. Of these are benzene, mono-" should read -- di- and trichloro derivatives. Of these the benzene, mono- --.

Signed and sealed this 3rd day of February 1970.

(SEAL)
Attest:

Edward M. Fletcher, Jr.  WILLIAM E. SCHUYLER, JR.
Attesting Officer  Commissioner of Patents